United States Patent Office 2,710,883
Patented June 14, 1955

2,710,883
SUCCINALDEHYDE MANUFACTURE

Thomas J. Mooney, Raritan Township, Middlesex County, N. J., assignor to E. I. du Pont de Nemours and Company, Wilmington, Del., a corporation of Delaware No Drawing. Application May 1, 1951,
Serial No. 224,074

8 Claims. (Cl. 260—601)

This invention relates to the production of succinaldehyde and in particular to a novel process for the production of succinaldehyde from tetrahydrofuran.

Succinaldehyde is a valuable reagent for the cross-linking of cellulose, regenerated cellulose, starch and other high molecular weight substances having recurring hydroxyl groups. It may, for example, be utilized to increase the wet tensile strength of paper and to increase the water resistance of starch. Succinaldehyde is also a useful chemical intermediate.

It is an object of this invention to provide a new, useful and economical process for the production of succinaldehyde. Another object is to provide a practical process for the production of succinaldehyde from tetrahydrofuran. These and other objects will be apparent from the ensuing description of the invention.

The objects of this invention are attained by passing tetrahydrofuran and an oxygen-containing gas into contact with a metallic silver or copper catalyst at a temperature of 200° to 500° C. in the vapor phase.

In one mode of carrying out the invention a mixture of tetrahydrofuran and air is passed through a preheater at a temperature sufficiently high to vaporize the tetrahydrofuran and the mixture is passed from the preheater into contact with a metallic silver or copper catalyst maintained at a temperature of 200° to 500° C. The gaseous products are condensed and succinaldehyde is isolated by vacuum distillation. Unreacted tetrahydrofuran may be recycled.

It is essential that the reaction temperature be maintained at 200° to 500° C. At temperature below 200° C. or above 500° C. appreciable amounts of succinaldehyde are not formed. Better results are obtained within the range 300 to 400° C. and it is preferred to operate at temperatures of 340° to 360° C. for optimum results.

Although both silver and copper catalysts are satisfactory in the operation of this invention, it is usually preferred to utilize silver as the catalyst since it has been found that under the conditions of the reaction copper is rather easily oxidized to copper oxides and the latter promote uncontrollable exothermic oxidation of the tetrahydrofuran to carbon oxides and water thus decreasing the efficiency of operation. The metallic catalyst may be used in any desired form either alone or on inert supports such as silica, alumina or other well-known materials. Good results have been obtained, for example, with silver crystals, silver gauze, silver-on-alumina, copper-on-silica and copper gauze.

Oxygen or gas mixtures containing oxygen are suitable for carrying out the process. It is preferred to utilize air as the oxygen-containing gas for economic reasons.

The proportion of oxygen to tetrahydrofuran is not critical and may be varied over wide limits with successful results. In general it is desirable that the vapor mixture passing into contact with the catalyst contain about 2 to 26% by volume of tetrahydrofuran.

The following examples illustrate the invention:

Example 1

A 1" stainless steel reactor tube 15" long with a centrally located thermocouple well was packed with 95 silver discs 1" in diameter, of 20 mesh silver gauze of 0.014" diameter wire to a depth of 3–4" and the tube heated to 350° C. using an electrically heated reactor furnace. Tetrahydrofuran (1.5 g./min.) and air (2100 ccs./min.) were metered into a preheated vaporizer at 100° C. and the resulting mixture passed over the heated catalyst. The reaction off-gases were condensed by water-cooled spiral condenser and three n-propyl alcohol scrubbers cooled in a Dry Ice bath. After 150 g. of tetrahydrofuran was oxidized, the reaction was shut down and the condensate and scrubber contents were analyzed for succinaldehyde using hydroxylamine hydrochloride method. A yield of 16.5 g. of succinaldehyde was obtained together with 113.9 g. of unreacted tetrahydrofuran.

Theory yield _____ g__ 179.0
Percent conversion yield _____ 9.2
Percent net yield _____ 43.1

Example 2

A 1" stainless steel reactor 15" long with a centrally located thermocouple well was packed with 25 discs of copper gauze to a depth of 1–1.5" and the tube heated to 345–365° C. using an electrically heated reactor furnace. Tetrahydrofuran (1.5 g./min.) and air (2100 ccs./min.) were metered into a preheated vaporizer at 100° C. and the resulting mixture passed over the heated catalyst. The reactor off-gases were condensed by a water-cooled spiral condenser and three n-propyl alcohol scrubbers cooled in a Dry Ice bath. After 150 g. of tetrahydrofuran was oxidized, the reaction was shut down and the condensate and scrubber contents analyzed for succinaldehyde using hydroxylamine hydrochloride method. A yield of 16.4 g. of succinaldehyde together with 123.6 g. of unreacted tetrahydrofuran was obtained.

Theory yield (succinaldehyde) _____ g__ 179.0
Percent conversion yield _____ 9.2
Percent net yield _____ 52.0

Example 3

A 1" stainless steel reactor tube with the centrally located thermocouple well was charged with 15 ccs. of silver crystals (held on 20 mesh screen) to a depth of 2¾ inches and heated to 330–360° C. using an electrically heated reactor furnace. Tetrahydrofuran (1.5 g./min.) and air (2100 ccs./min.) were metered into the preheated vaporizer at 100° C. and the resulting mixture passed over the heated catalyst bed. The reactor off-gases were condensed by a water-cooled spiral condenser and three Dry Ice-cooled n-propyl alcohol scrubbers. After 150 g. of tetrahydrofuran was oxidized the reaction was stopped and condensate and scrubbers analysed for succinaldehyde by the hydroxylamine hydrochloride method. A yield of 11.6 g. of succinaldehyde was obtained together with 114 g. of unreacted tetrahydrofuran.

Theory yield _____ g__ 179.0
Percent conversion yield _____ 6.5
Percent net yield _____ 27.0

Example 4

The 1" stainless steel reactor tube with the centrally located thermocouple well was charged with 15 ccs. of silver-plated "boileezers" (precipitated silver an $Al_2O_3$) approximately 4–6 mm. in diameter to a depth of 2¾ inches and heated to 315–325° C. using an electrically heated reactor furnace. Tetrahydrofuran (0.75 g./min.)

and air (1040 g./min.) were metered into a vaporizer at 100° C. and the resulting mixture passed over the heated catalyst bed until 150 g. of tetrahydrofuran was vaporized. The reactor off-gases were condensed by a water-cooled spiral condenser and three Dry-Ice-cooled n-propyl alcohol scrubbers and analyzed for succinaldehyde. A yield of 1.6 g. of succinaldehyde was obtained together with 105.4 g. of water and unreacted tetrahydrofuran.

*Example 5*

A copper on silica catalyst prepared by coagulating equal portions of copper dust and silica in a 30% colloidal silica solution, was baked to dryness at 120° C. and screened to #6 mesh size. The 1" stainless steel reactor was charged with 15 ccs. of this catalyst and heated to 350° C. using an electrically heated reactor furnace. Tetrahydrofuran (1.5 g./min.) and air (2000 ccs./min.) were metered into a vaporizer at 100° C. and the mixture passed over the heated catalyst bed until 150 g. of tetrahydrofuran was oxidized. The reactor gases were condensed by a water-cooled spiral condenser and a series of three n-propyl alcohol scrubbers cooled in a Dry Ice bath and anlyzed for succinaldehyde using hydroxylamine hydrochloride. A yield of 2.0 g. of succinaldehyde was obtained together with 88 g. of water and unreacted tetrahydrofuran.

*Example 6*

The 1" stainless steel reactor tube was charged to a depth of 2–3" with bronze window screen clippings and heated to 350° C. using an electrically heated reactor furnace. Tetrahydrofuran (1.5 g./min.) and air (2100 g./min.) were metered into a vaporizer at 100° C. and the mixture passed over the heated catalyst bed until 150 g. of tetrahydrofuran was oxidized. The reactor gases were condensed by a water-cooled spiral condenser and a series of three n-propyl alcohol scrubbers cooled in a Dry Ice bath and analyzed for succinaldehyde by hydroxylamine hydrochloride procedure. A yield of 5.4 g. of succinaldehyde was obtained together with 135.9 g. of unreacted tetrahydrofuran and water.

Theory yield (succinaldehyde) _____ g.__ 179.0
Percent conversion yield _____ 3.0

The succinaldehyde product was identified by formation of succinaldoxime which melted at 169° to 171° C.

The process of this invention provides a simple and practical method for the production of succinaldehyde, a valuable reagent for cross-linking cellulose and other materials and a useful chemical intermediate.

I claim:
1. The process for the production of succinaldehyde which comprises passing tetrahydrofuran and an oxygen-containing gas into contact with a catalyst from the group consisting of metallic silver and copper at a temperature of 200° to 500° C. in the vapor phase.
2. The process of claim 1 wherein the oxygen-containing gas is air.
3. The process of claim 1 wherein the temperature is 340° to 360° C.
4. The process for the production of succinaldehyde which comprises passing tetrahydrofuran and an oxygen-containing gas into contact with a metallic silver catalyst at a temperature of 200° to 500° C. in the vapor phase.
5. The process for the production of succinaldehyde which comprises passing tetrahydrofuran and air into contact with a metallic silver catalyst at a temperature of 340° to 360° C. in the vapor phase.
6. The process which comprises contacting a vapor phase mixture of tetrahydrofuran and an oxygen-containing gas with a catalyst of the group consisting of metallic copper and silver at a temperature of 200°–500° C. and subsequently recovering succinaldehyde from the resultant mixed gases.
7. The process which comprises contacting a vapor phase mixture of tetrahydrofuran and air with a metallic copper catalyst at a temperature of about 340°–360° C. and subsequently condensing succinaldehyde from the resultant mixed gases.
8. The process which comprises contacting a vapor phase mixture of tetrahydrofuran and air with a metallic silver catalyst at a temperature of about 340°–360° C. and subsequently condensing succinaldehyde from the resultant mixed gases.

References Cited in the file of this patent
UNITED STATES PATENTS

| | | |
|---|---|---|
| 2,075,100 | Dreyfus | Mar. 30, 1937 |
| 2,246,569 | Brown | June 24, 1941 |

FOREIGN PATENTS

| | | |
|---|---|---|
| 699,945 | Germany | Dec. 10, 1940 |
| 608,539 | Great Britain | Sept. 16, 1948 |

OTHER REFERENCES

Ind. and Eng. Chemistry (February 1948), vol. 40, No. 2 (pp. 217–218).